Figure 1:
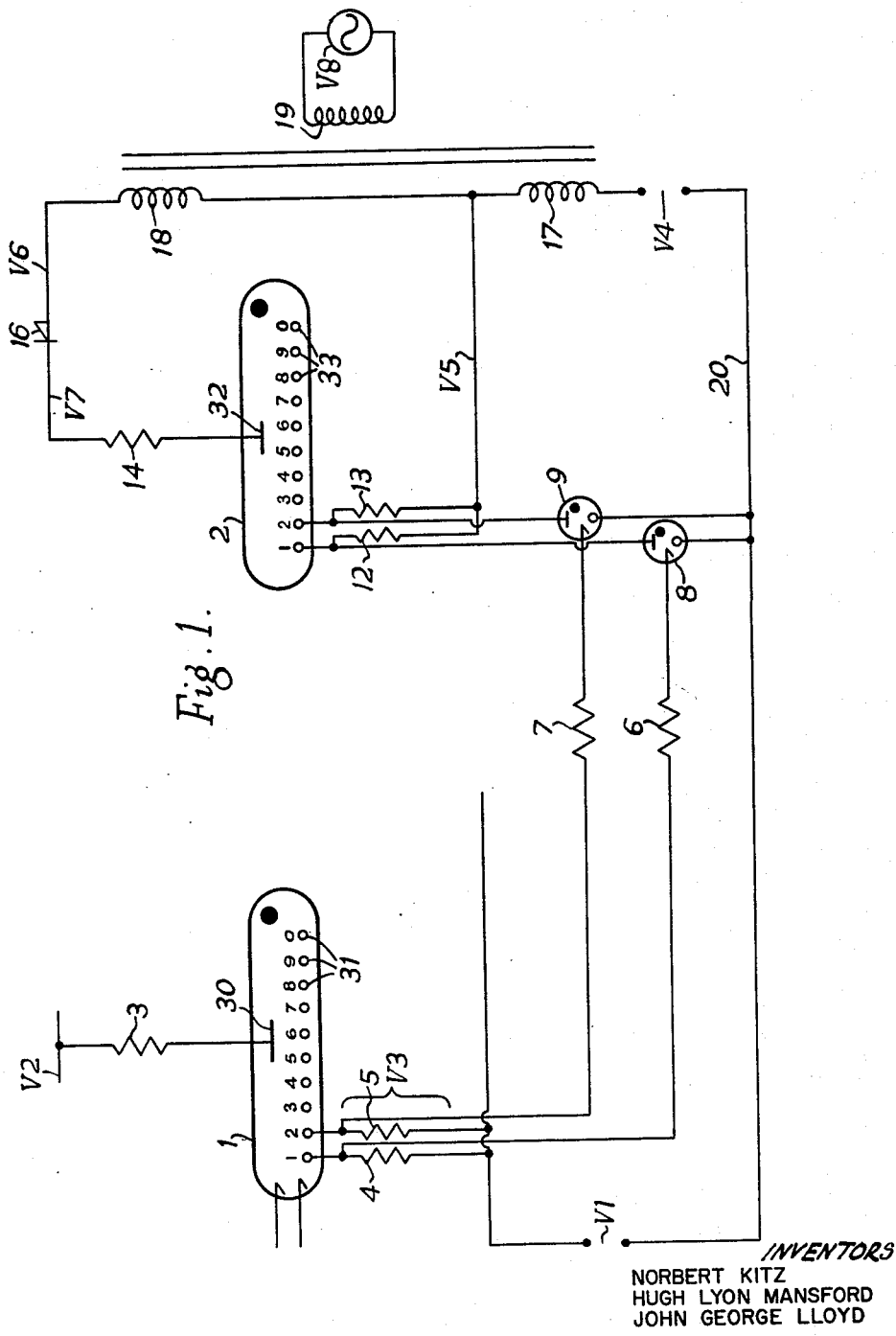

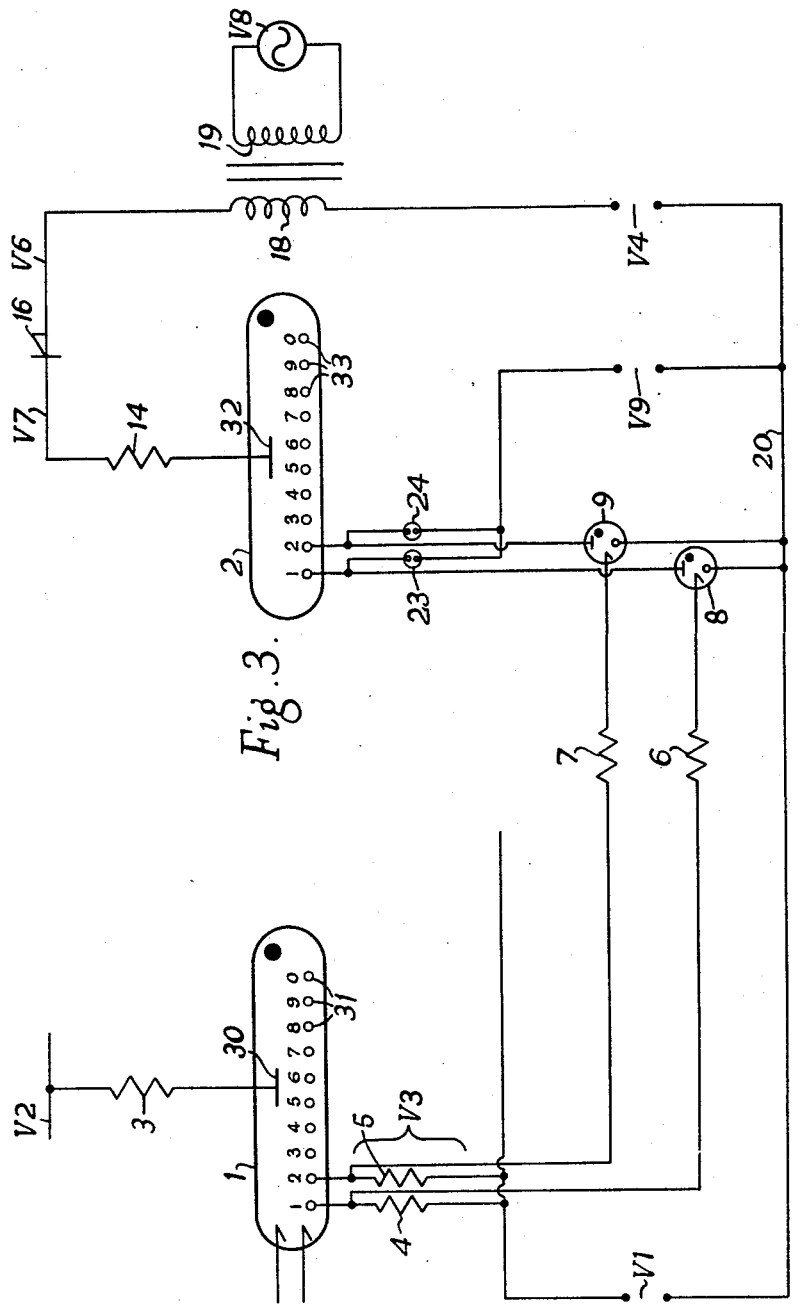

United States Patent Office 3,183,404
Patented May 11, 1965

3,183,404
CONTROL CIRCUITS FOR MULTICATHODE
INDICATING DEVICES
Norbert Kitz, Hugh Lyon Mansford, and John George
Lloyd, London, England, assignors to Bell Punch Company Limited, London, England, a British company
Filed July 20, 1960, Ser. No. 44,110
Claims priority, application Great Britain, Aug. 11, 1959,
27,433/59
11 Claims. (Cl. 315—135)

This invention relates to indicating devices and its object is to provide an electrical circuit for transferring digital information registered in a multi-cathode counting tube to a cold-cathode indicating tube.

Multi-cathode counting tubes are employed as numerical indicators by arranging that a glow discharge can at will be positioned on any selected one of a plurality of cathodes in order to indicate by the position of the glow the numeral which the tube is intended to register. Normally there are ten cathodes, each cathode being indicative of one of the numerals 0 to 9.

The glow upon the cathode of a multi-cathode counting tube can be visible, and its position around the circumference of a circle formed by a ring of cathodes can convey, in some circumstances, to the mind of an observer sufficient indication to enable the observer to determine which particular number of a series of numbers the glow on the cathode is intended to represent.

The provisions normally made to effect the transfer of a glow from one cathode of a multi-cathode counting tube to the next adjacent cathode, are not herein described as these are well known in the art.

In a cold-cathode indicating tube, such as the tube known commercially as the Nixie HB–106, each of ten cathodes is shaped to the physical form of one of the numerals 0 to 9 and in an arrangement according to the present invention the cathode of a cold-cathode indicating tube which corresponds to the glowing cathode of a multi-cathode counting tube is automatically arranged to glow.

It will be appreciated that a multi-cathode counting tube normally has a current flowing to the glowing cathode, which serves also to bias this cathode positively with respect to the remaining cathodes. This positive bias comprises the external electrical indication of the position of the glow, but its potential is opposite to that required to draw the glow in a cold-cathode indicating tube to a particular cathode.

The present invention comprises an electrical circuit including a multi-cathode counting tube, a cold-cathode indicating tube and means interconnecting corresponding cathodes of the two tubes, wherein the potential of each cathode of the counting tube serves to control a trigger tube connected in circuit with the corresponding cathode of the indicating tube and wherein means are provided for limiting the potential on the anode of each trigger tube.

Each cathode of the indicating tube may be connected through an individual resistor to a source of potential which preferably consists of an alternating and a direct component. In this case the anode of the indicating tube should also be connected to a source of potential which includes a direct component and a component alternating in phase with the alternating component applied to the cathodes.

In an alternative arrangement each cathode of the indicating tube is connected to a source of potential through an individual asymmetrically conducting device.

In yet another alternative arrangement each cathode of the indicating tube is connected to a source of potential through a cold-cathode gas-discharge tube.

Three methods of performing the invention will now be described with reference to the accompanying diagrammatic drawings.

In the circuit arrangement illustrated in FIGURE 1 a multi-cathode counting tube 1 is interconnected with a cold-cathode indicating tube 2 in such a manner that when a discharge takes place between the anode 30 and one of the cathodes 31 of the counting tube a discharge is also effected between the anode 32 and the corresponding cathode 33 of the cold-cathode counting tube 2.

The anode of the counting tube 1 is connected through a resistor 3 to a source of positive potential V2. Each cathode of the counting tube 1 is connected to the corresponding cathode of the indicating tube 2 by a circuit similar to those illustrated in connection with the first and second cathodes of both tubes. The first cathode of the counting tube 1 is connected to a source of positive potential V1 through a resistor 4 and the second cathode is connected to the same source through a resistor 5. The remaining cathodes are also connected to this source through corresponding resistors.

The first cathode of the indicating tube 2 is connected to an earth line 20 through the discharge path of a trigger tube 8 and the second cathode is connected to the earth line through the discharge path of a trigger tube 9. The trigger electrode of the trigger tube 8 is connected through a resistor 6 to the first cathode of the counting tube 1 and the trigger electrode of the trigger tube 9 is connected through a resistor 7 to the second cathode of the counting tube 1. Similarly connected trigger tubes are provided in the circuits of the other cathodes of the indicating tube 2. In addition the first cathode of the indicating tube 2 is connected through a resistor 12 to a line indicated by the reference numeral V5 and the second cathode is connected through a resistor 13 to the same line. This line is connected to one end of a secondary winding 17 of a transformer and the other end of this secondary winding is connected through a D.C. source V4 to earth. The primary winding 19 of this transformer is connected to an alternating source V8. Thus, the potential of the line V5 includes an alternating component derived from the secondary winding 17 and a D.C. component derived from the source V4.

The anode of the indicating tube 2 is connected through a resistor 14 and a rectifier 16 to one end of a further secondary winding 18 of the transformer. The other end of this secondary winding is connected to the line V5. No smoothing is provided for the output of the rectifier so that the potential V7 applied to the anode of the indicating tube 2 includes a D.C. component and a component alternating with respect to the earth line 20 in phase with the voltage on the line V5.

The bias voltage V1 which is applied to the trigger electrodes of the trigger tubes 8 and 9 is just below the nominal control gap break-down voltage for these tubes. When the glow in the counting tube 1 rests, for example, on the second cathode, current flows through the resistor 5 and a potential V3 is developed across the resistor 5. Accordingly under these conditions the voltage applied between the trigger electrode and the cathode of the trigger tube 9 is substantially the sum of the voltages V1 and V3. This sum is above the control gap break-down voltage of the tube 9 and accordingly this tube passes current between its anode and its cathode. The instantaneous value of the potential on the anode of the tube 9 is determined primarily by the sum of the voltage V4 and the instantaneous value of the alternating voltage developed across the transformer winding 17. The voltage V4 is slightly larger than the nominal main gap maintaining voltage for the tube 9, and the alternating voltage developed across the winding 17 (which may, for example, be sinusoidal) is such as to give a peak voltage between the anode and cathode of each trigger tube which is slightly below the nominal main gap break-down voltage for these tubes. Accordingly, assuming that the glow in the counting tube 1 is resting on the second cathode, the trigger tube 9 will fire as soon as the anode-cathode potential in the tube 9 is sufficient to break down the main gap with the control gap ionised. Thus current flows through the tube 9 during the positive half-cycles of the voltage developed across the transformer winding 17, but for a part of each negative half-cycle the voltage applied to the anode of the tube 9 drops below the main gap maintaining voltage so that the tube ceases to pass current. As the control gaps of the trigger tubes other than the trigger tube 9 are not ionised, their anode-cathode potentials do not reach a value sufficient to break down their main gaps and accordingly no current flows through any of these tubes.

During the positive half-cycles of the voltage developed across the winding 17 the current in the resistor 13 is increased, although the potential of the second cathode of the indicating tube 2 is maintained constant by the regulating action of the trigger tube 9. The potential drop in the resistor 13 represents a differential bias applied negatively between the second cathode and the remaining cathodes of the indicating tube 2. This bias condition attracts current from the anode 32 of the tube 2 to the second cathode, which accordingly glows.

It is necessary to modulate the discharge current in the indicating tube 2 in phase with the potential on the line V5, so that no current flows in the tube 2 during negative half-cycles of the alternating voltage developed across the winding 17. In the absence of such modulation the glow in the indicating tube 2 would spread to all the cathodes during these negative half-cycles since none of the trigger tubes would be conductive and there would therefore be no differential bias on any of the cathodes. The discharge current of the indicating tube 2 is modulated in the arrangement illustrated by taking the anode supply from the secondary winding 18 of the transformer. The rectifier 16 prevents the negative half-cycles of the voltage across the winding 18 from being applied to the anode of the indicating tube.

It has so far been assumed that the voltages across the secondary windings 17 and 18 are sinusoidal, but it is to be understood that rectangular or other wave forms may be used instead.

Some advantages of the circuit described above are as follows:

(1) The use of a varying potential for supplying the anodes of the trigger tubes causes any conducting tube to be extinguished periodically, thus facilitating changes in the information displayed by the indicating tube 2.

(2) Modulating the source of anode potential for the indicating tube 2 in phase with the cathode potential restricts the cathode glow to the desired cathode.

(3) This modulation of the anode current of the tube 2 serves to prolong its life.

(4) The application of a potential which is made up of the sum of the constant potential V4 and the alternating potential developed across the transformer winding 17, through anode resistors to the anodes of the trigger tubes enables the differential bias between the cathodes of the indicating tube 2 to be accurately controlled between the limits set by the nominal main gap maintaining voltage and the minimum main gap break-down voltage of the trigger tubes.

Figure 2:
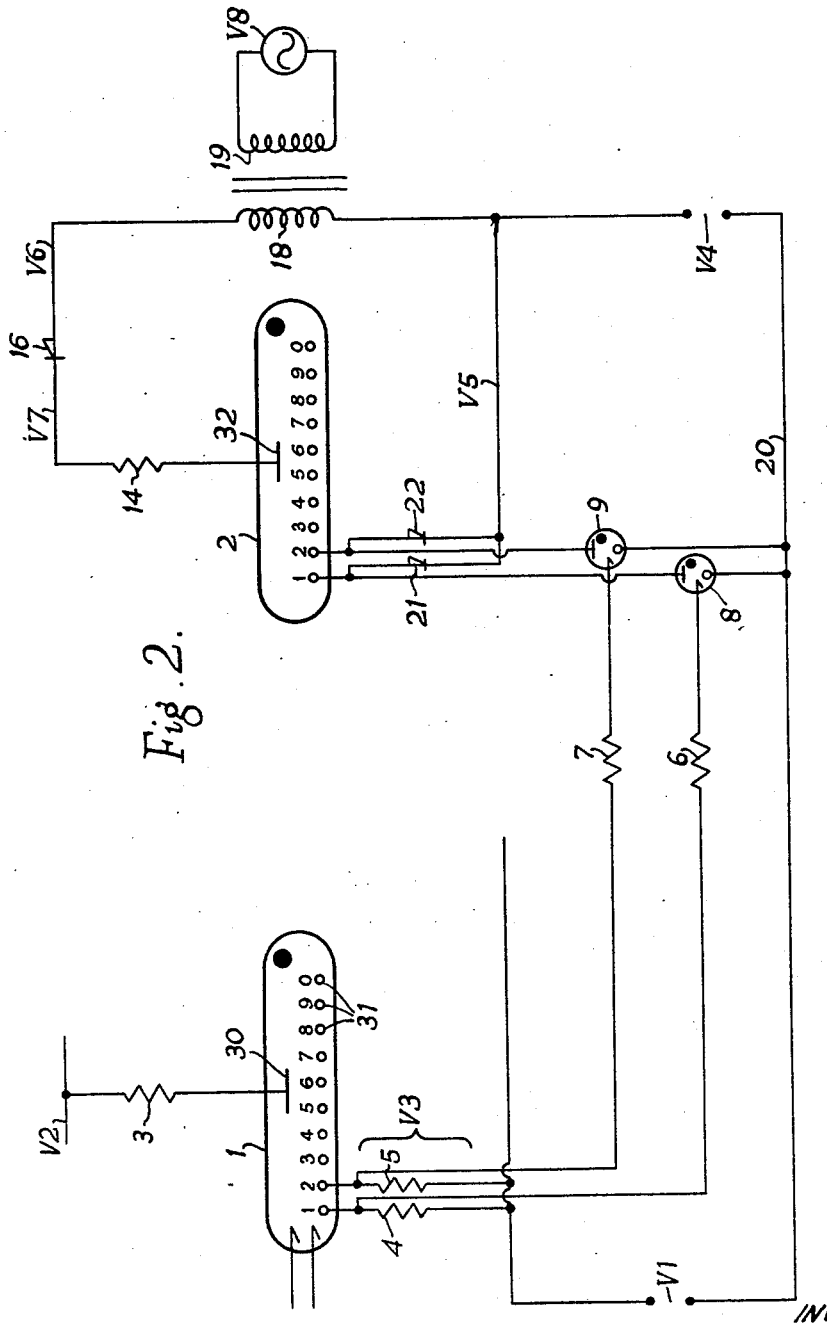

FIGURE 2 illustrates a modification of the circuit illustrated in FIGURE 1 in which the resistors 12 and 13 are replaced by asymmetrically conducting devices such as diodes 21 and 22. In this modification the secondary winding 17 is omitted and the voltage V4 is applied directly through the diodes such as 21 and 22 to the cathodes of the indicating tube 2. The potential V4 in this case is slightly below the minimum main gap break-down voltage of the trigger tubes, so that the only trigger tube that is conductive is the one whose trigger electrode is connected to the glowing cathode of the counting tube 1. The diodes such as 21 and 22 prevent the anode-cathode potential of any of the trigger tubes from exceeding the main gap break-down voltage since any one of them will conduct if the potential on the associated cathode of the indicating tube 2 rises as a result of the "dark current" flowing thereto from the main ionised gas stream. In the absence of these diodes and the clamping potential V4 this dark current would tend to raise the potential of each cathode except the glowing cathode towards the potential of the anode.

FIGURE 3 shows a modification of the circuit illustrated in FIGURE 2 in which the diodes 21 and 22 are replaced by cold-cathodes gas-discharge tubes 23 and 24. In this circuit arrangement a separate bias supply V9 is provided for setting the maximum potential of the cathodes of the tube 2. The supply V4 may be retained or omitted as desired. In the latter case, of course, the lower end of the secondary winding 18 is connected directly to the earth line 20. The value of V9 is such that the sum of V9 and the break-down voltage of any of the tubes such as 23 and 24 is slightly lower than the minimum main gap break-down voltage of the trigger tubes such as 8 and 9. Each of the cathodes of the tube 2 except the glowing cathode passes its "dark current" via its associated discharge tube. The potential of the glowing cathode will be reduced to such an extent that the associated discharge tube such as 23 and 24 will be non-conductive.

What we claim as our invention and desire to secure by Letters Patent of the United States is:

1. An electrical circuit comprising a multi-cathode counting tube, a cold-cathode indicating tube having multiple cathodes, a separate trigger tube connected in each cathode circuit of the indicating tube, means connecting each cathode of the counting tube to the control electrode of the trigger tube in the corresponding cathode circuit of the indicating tube, and means for limiting the potential on the anode of each trigger tube to a value lower than the potential required to cause main gap breakdown of such trigger tube when no potential is applied to the control electrode thereof.

2. An electrical circuit comprising a multi-cathode counting tube, a cold-cathode indicating tube having multiple cathodes, a separate trigger tube connected in each cathode circuit of the indicating tube with the anode of such trigger tube adjacent the cathode of the indicating tube, means connecting each cathode of the counting tube to the control electrode of the trigger tube in the corresponding cathode circuit of the indicating tube, and a separate resistor connecting the anode of each said trigger tube to a source of potential, the maximum potential supplied by said source being lower than the potential required to cause main gap breakdown in such trigger tubes when no potential is applied to the control electrodes thereof.

3. An electrical circuit as claimed in claim 2, wherein said potential comprises an alternating and a direct component.

4. An electrical circuit comprising a multi-cathode counting tube, a cold-cathode indicating tube having multiple cathodes, a separate trigger tube connected in each cathode circuit of the indicating tube with the anode of such trigger tube adjacent the cathode of the indicating tube, means connecting each cathode of the counting tube to the control electrode of the trigger tube in the corresponding cathode circuit of the indicating tube, means connecting the anode of each said trigger tube to a source of potential which comprises an alternating and a direct component, and means connecting the anode of the indicating tube to a source of potential which comprises a direct component and a component alternating in phase with the alternating component applied to the cathodes.

5. An electrical circuit comprising a multi-cathode counting tube, a cold-cathode indicating tube having multiple cathodes, individual trigger tubes having their anodes connected to the respective cathodes of the indicating tube, individual resistors connecting the respective cathodes of the counting tube to the control electrodes of the trigger tubes in the associated cathode circuits of the indicating tubes, a transformer having a primary winding and two interconnected secondary windings, an alternating-current source connected to said primary winding of said transformer, individual resistors connecting the respective cathodes of the indicating tube to the junction of said secondary windings, a direct-current source connected between the free end of one of said secondary windings and the cathodes of all said trigger tubes, and a rectifier and a resistor connected in series between the free end of the other of said secondary windings and the anode of the indicating tube.

6. An electrical circuit comprising a multi-cathode counting tube, a cold-athode indicating tube having multiple cathodes, a separate trigger tube connected in each cathode circuit of the indicating tube with the anode of such trigger tube adjacent the cathode of the indicating tube, means connecting each cathode of the counting tube to the control electrode of the trigger tube in the corresponding cathode circuit of the indicating tube, and means connecting said anodes of said trigger tubes to a source of potential, the maximum potential supplied by said source being lower than the potential required to cause main gap breakdown in such trigger tubes when no potential is applied to the control electrodes thereof.

7. An electrical circuit comprising a multi-cathode counting tube, a cold-cathode indicating tube having multiple cathodes, a separate trigger tube connected in each cathode circuit of the indicating tube, means connecting each cathode of the counting tube to the control electrode of the trigger tube in the corresponding cathode circuit of the indicating tube, and individual asymmetrically conducting devices connecting the respective anodes of said trigger tubes to a source of potential.

8. An electrical circuit comprising a multi-cathode counting tube, a cold-cathode indicating tube having multiple cathodes, a separate trigger tube connected in each cathode circuit of the indicating tube with the anode of such trigger tube adjacent the cathode of the indicating tube, means connecting each cathode of the counting tube to the control electrode of the trigger tube in the corresponding cathode circuit of the indicating tube, and separate individual cold-cathode gas-discharge tubes connected between the anode of each trigger tube and a source of potential the sum of the breakdown potential of said gas discharge tubes and the maximum value of potential supplied by said source being lower than the potential required to cause main gap breakdown in said trigger tubes when no potential is applied to the control electrodes thereof.

9. An electrical circuit comprising a multi-cathode counting tube, a cold-cathode indicating tube having multiple cathodes, a trigger tube connected in each cathode circuit of the indicating tube, means connecting each cathode of the counting tube to the control electrode of the trigger tube in the corresponding cathode circuit of the indicating tube, and means for limiting the positive excursion of potential of the anode of each trigger tube with respect to the cathode thereof to a value below the main gap breakdown voltage of the trigger tubes when no potential is applied to the control electrodes thereof.

10. An electrical circuit comprising a multi-cathode counting tube, a cold-cathode indicating tube having a plurality of cathodes, a separate trigger tube connected between each cathode of the counting tube and the corresponding cathode of the indicating tube, each counting tube cathode and each corresponding indicating tube cathode being connected, respectively, to the control electrode and anode of the interconnecting trigger tube, said circuit further comprising a source of potential having first and second terminals, said first terminal being connected to the cathodes of all said trigger tubes and separate means including an electrical impedance device for coupling said second terminal to each of said trigger tube anodes, the maximum value of the potential produced by said source being less than the potential required to initiate breakdown of the main gap of said trigger tubes when no potential is applied to the control electrodes thereof.

11. An electrical circuit in accordance with claim 10 wherein the potential produced by said source includes a unidirectional component and an alternating component, the magnitude of the unidirectional component being slightly greater than the potential required to maintain breakdown across the main gap of said trigger tubes after initiation of such breakdown and the maximum magnitude of the sum of said direct and alternating components being less than the potential required to initiate main gap breakdown of said trigger tubes when no potential is applied to the control electrodes thereof.

References Cited in the file of this patent

UNITED STATES PATENTS

| | | |
|---|---|---|
| 2,608,674 | Depp | Aug. 26, 1952 |
| 2,769,939 | Williams | Nov. 6, 1956 |
| 2,808,535 | Lee | Oct. 1, 1957 |
| 2,817,815 | Evans | Dec. 24, 1957 |
| 2,906,906 | McCauley et al. | Sept. 29, 1959 |
| 2,954,507 | Kitz et al. | Sept. 27, 1960 |